(12) United States Patent
Chou et al.

(10) Patent No.: US 6,310,837 B1
(45) Date of Patent: Oct. 30, 2001

(54) MAGNETIC RECORDING MEDIUM

(75) Inventors: Tsutomu Chou; Masao Shigeta; Masahiro Karatsu; Mari Fujii; Chikara Ishizaka; Katsumi Saito, all of Chiba; Katsuhiko Wakayama, Ibaraki; Shohei Mimura; Masahiro Ito, both of Kanagawa, all of (JP)

(73) Assignees: TDK Corporation; Tokyo Magnetic Printing Co., Ltd., both of Tokyo (JP)

( * ) Notice: Subject to any disclaimer, the term of this patent is extended or adjusted under 35 U.S.C. 154(b) by 0 days.

(21) Appl. No.: 09/170,083

(22) Filed: Oct. 13, 1998

Related U.S. Application Data

(63) Continuation of application No. PCT/JP98/60569, filed on Feb. 12, 1998.

(30) Foreign Application Priority Data

Feb. 12, 1997  (JP) .......................................... 9-42896

(51) Int. Cl.$^7$ .............................. G11B 5/66; G11B 11/00
(52) U.S. Cl. .......................... 369/13; 369/288; 428/64.3; 428/402
(58) Field of Search ................... 369/13, 275.3, 369/275.1; 428/64.3, 64.4, 402; 235/493, 380, 449, 487; 360/2

(56) References Cited

U.S. PATENT DOCUMENTS

| | | | |
|---|---|---|---|
| 5,277,977 | * | 1/1994 | Tokuoka et al. ..................... 428/402 |
| 5,471,044 | | 11/1995 | Hotta et al. . | |

FOREIGN PATENT DOCUMENTS

| | | |
|---|---|---|
| 0 219 714 | 4/1987 | (EP) . |
| 0 238 069 | 9/1987 | (EP) . |
| 0 291 306 | 11/1988 | (EP) . |
| 0 706 191 | 4/1996 | (EP) . |
| 0 738 782 | 10/1996 | (EP) . |
| 2 091 638 | 8/1982 | (GB) . |
| 63-229618 | 9/1988 | (JP) . |
| 2-253997 | 10/1990 | (JP) . |
| 2-254627 | 10/1990 | (JP) . |
| 3-181018 | 8/1991 | (JP) . |
| 3-239594 | 10/1991 | (JP) . |
| 8-218149 | 8/1996 | (JP) . |

OTHER PUBLICATIONS

S. Takahashi, et al., J. Phys.:Condens. Matter 3, pp. 5805–5816, "Superlattice Dislocations and Magnetic Transition in Fe–Al Alloys with the B2–Type Ordered Structure", 1991.

S. Takahashi, et al., J. Phys.: Condens. Matter 8, pp. 11243–11257, "Spin Distribution in Plastically Deformed Fe–Al Intermetallic Compounds", 1996.

S. Takahashi, Journal of Magnetism and Magnetic Materials, vol. 54–57, pp. 1065–1066, "Local Environment Effects in Cold–Worked Fe–Al Alloys", 1986.

\* cited by examiner

*Primary Examiner*—Ali Neyzari
(74) *Attorney, Agent, or Firm*—Oblon, Spivak, McClelland, Maier & Neustadt, P.C.

(57) ABSTRACT

The invention is a magnetic recording medium which is effectively protected against forgery by the alteration of recorded data, and a method for carrying out writing and reading on this magnetic recording medium. The magnetic recording medium of the invention comprises a recording material composed of a crystalline alloy containing Fe and Al . In the recoding material, the total amount of Fe and Al is at least 90 at % and the atomic ratio Al/(Fe+Al) ranges from 0.30 to 0.45. The recording material changes from a disordered phase to an ordered phase by heating. The recording material has a saturation magnetization of at least 45 emu/g prior to heating and lowers its saturation magnetization by at least 35 emu/g upon heating. Dark regions are observable in a bright-field image of the recording material by transmission electron microscopy, the dark regions accounting for 15–60% of the recording material in areal ratio and having a maximum breadth of 10–200 nm.

27 Claims, 13 Drawing Sheets

100nm

|—|
100nm

|—|
50nm

100nm

200nm

|←→|
50nm

MAGNETIC RECORDING MEDIUM

This application is a Continuation of International Application No. PCT/JP98/00569, filed on Feb. 12, 1998.

TECHNICAL FIELD

This invention relates to magnetic recording media, typically magnetic cards and a method for writing and reading data from such magnetic recording media.

BACKGROUND ART

In the recent years, magnetic cards enjoy widespread use in a variety of fields. In particular, the magnetic cards find an expanding application as rewritable or prepaid cards in which monetary information is recorded as magnetic bits of information so that the amount of money may be reduced on every use.

In this application, the safety of the card system is fatally lost if magnetic cards are not fully protected against forgery by the alteration of recorded data or counterfeit cards can be easily produced. There is a strong demand for magnetic cards having a protective function of preventing the alteration of recorded data. To meet the demand, a variety of magnetic cards have been proposed and used in practice. For example, if magnetic cards are locally provided with a region of a special material, they are difficult to counterfeit and whether they are false or true can be judged by detecting the special region. Magnetic cards with a complex layer arrangement are also known.

These magnetic cards having the protective function incorporated therein are difficult to forge or duplicate a number of counterfeit cards. However, there is still a possibility that the monetary information in an exhausted card be restored to the initial information by false alteration, for example, by rewriting the monetary information. One countermeasure is to punch holes in the card in accordance with the number of uses although this yet raises several problems that precise agreement is not expectable, punched chips are left, and repair by refilling the holes is possible. Another possible countermeasure is to record visible data corresponding to the number of uses by thermographic recording. These cards carrying visible data, however, are weak against staining because the visible data must be optically read. The falsification of the record is easy on account of visible data. Another problem is that optical readers are generally expensive. There are available no practical means which are quite effective for protection against forgery.

SUMMARY OF THE INVENTION

Therefore, an object of the present invention is to provide a magnetic recording medium which is effectively protected against forgery by the alteration of recorded information, and to provide a method for recording and reading data from the magnetic recording medium.

This and other objects are attained by any of the following constructions (1) to (19).

(1) A magnetic recording medium comprising a recording material composed of a crystalline alloy containing iron and aluminum and capable of transition from a disordered phase to an ordered phase by heating, said recording material having saturation magnetization of at least 45 emu/g in the disordered phase which is at least 35 emu/g higher than the saturation magnetization in the ordered phase.

(2) The magnetic recording medium of (1) wherein said recording material has a ratio of the saturation magnetization in the disordered phase to the saturation magnetization in the ordered phase which is at least 2/1.

(3) A magnetic recording medium comprising a recording material composed of a crystalline alloy containing iron and aluminum wherein dark regions are observable in a bright-field image by transmission electron microscopy, the dark regions accounting for 15 to 60% in areal ratio.

(4) A magnetic recording medium comprising a recording material composed of a crystalline alloy containing iron and aluminum wherein dark regions having a breadth of 10 to 200 nm are observable in a bright-field image by transmission electron microscopy.

(5) The magnetic recording medium of (4) wherein in the bright-field image of said recording material, the dark regions account for 15 to 60% in areal ratio.

(6) The magnetic recording medium of any one of (3) to (5) wherein the presence of a $Fe_3Al$ type crystal lattice in the dark regions is ascertainable.

(7) The magnetic recording medium of any one of (1) to (6) wherein in said recording material, the total amount of iron and aluminum is at least 90 at % and the atomic ratio Al/(Fe+Al) ranges from 0.30 to 0.45.

(8) A magnetic recording medium comprising a recording material composed of a crystalline alloy containing iron and aluminum wherein the total amount of iron and aluminum is at least 90 at % and the atomic ratio Al/(Fe+Al) ranges from 0.30 to 0.45.

(9) The magnetic recording medium of (7) or (8) wherein aluminum in said recording material is replaced by $M^I$ which is at least one element selected from the group consisting of silicon, germanium, tin, antimony, bismuth, molybdenum, tungsten, niobium, tantalum, titanium, zirconium, and hafnium, and the content of $M^I$ in said recording material is up to 10 at %.

(10) The magnetic recording medium of any one of (7) to (9) wherein iron in said recording material is replaced by $M^{II}$ which is at least one element selected from the group consisting of cobalt, nickel, manganese, chromium, vanadium, and copper, and the content of $M^{II}$ in said recording material is up to 20 at %.

(11) The magnetic recording medium of any one of (7) to (10) wherein said recording material further contains up to 10 at % of $M^{III}$ which is at least one element selected from the group consisting of boron, carbon, nitrogen, and phosphorus.

(12) The magnetic recording medium of any one of (3) to (11) wherein said recording material has saturation magnetization of at least 45 emu/g and lowers its saturation magnetization by at least 35 emu/g upon heating.

(13) The magnetic recording medium of any one of (3) to (12) wherein said recording material has a ratio of the saturation magnetization before heating to the saturation magnetization after heating which is at least 2/1.

(14) The magnetic recording medium of any one of (1) to (13) wherein said recording material is a powder of flattened particles.

(15) The magnetic recording medium of any one of (1) to (14) which is a magnetic card comprising a resinous substrate and an irreversible recording layer thereon containing said recording material.

(16) A method for carrying out writing and reading on the magnetic recording medium of any one of (1) to (15), wherein writing is carried out by heating at least a portion of the recording material by means of a thermal head or laser beam, for changing the saturation magnetization of the recording material in an irreversible manner.

(17) The method of (16) wherein after writing, reading is carried out by detecting the magnetization of the recording material.

(18) The method of (16) wherein after writing, reading is carried out by applying dc magnetic field across the magnetic material and then detecting magnetic flux from the recording material.

(19) The method of (16) wherein after writing, reading is carried out by detecting the magnetization of the recording material while applying dc magnetic field across the magnetic material.

FUNCTION AND EFFECT

Owing to the non-rewritable recording material, the magnetic recording medium of the invention is quite difficult to falsely alter the recorded data. When applied as magnetic cards, the medium of the invention is highly safe against forgery. In addition, since the information data can be magnetically read out, a write/read equipment may be relatively inexpensive.

JP-A 77622/1996 discloses an irreversible recording medium using as a magnetic recording material an alloy wherein the ratio of the saturation magnetization in a crystalline state to the saturation magnetization in an amorphous state is 5/1 or higher. In contrast, the non-rewritable recording material used in the present invention is a crystalline alloy and is more stable than the amorphous recording material of this reference.

THE BEST MODE FOR CARRYING OUT THE INVENTION

Figure 1:
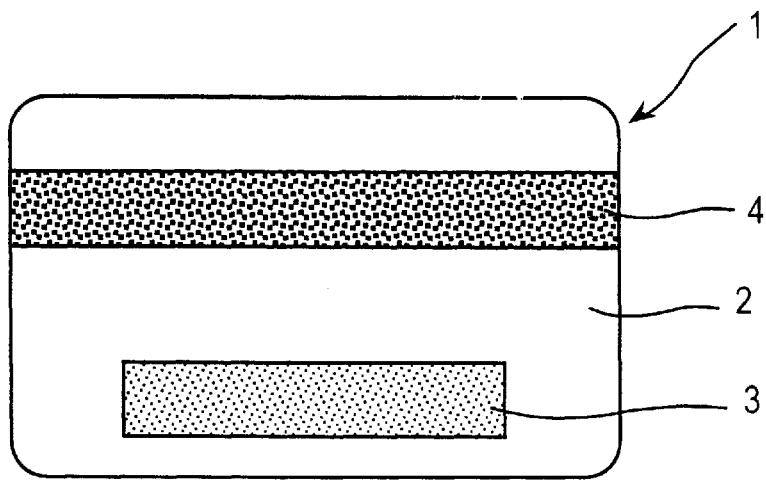
FIG. 1 is a plan view of one exemplary construction of a magnetic card to which the magnetic recording medium of the invention is applied.

Several embodiments of the present invention are described below in detail.

The magnetic recording medium of the invention comprises a recording material composed of a crystalline alloy which undergoes an irreversible drop of saturation magnetization in response to an irreversible transformation from a disordered phase to an ordered phase. Utilizing this nature of the recording material, the present invention carries out writing and reading. Illustratively, the saturation magnetization of the recording material is decreased by heating.

The recording material which is used herein contains iron (Fe) and aluminum (Al). The total amount of Fe and Al is preferably at least 90 at %. The atomic ratio Al/(Fe+Al) representing the content of aluminum is preferably in the range from 0.30 to 0.45, more preferably from 0.35 to 0.42.

It is considered, in an equilibrium state, this crystalline alloy exhibits an ordered phase and paramagnetism which shows little magnetization. However, once this crystalline alloy is worked, for example, once the alloy is quenched by a liquid quenching, sputtering or evaporation technique and preferably, further milled or otherwise worked, the alloy assumes a disordered structure with concomitant lattice strain and acquires ferromagnetism by changing the environment of iron atoms which govern magnetism of the alloy. Since the alloy which has been converted into the disordered structure will decrease its saturation magnetization through structural relaxation upon heating, recording utilizing magnetic changes by heating becomes possible. In order that the alloy which has decreased its saturation magnetization by heating be converted back to the disordered structure prior to heating, the recording material must be heated to approximately its melting point and then worked again. Where the invention is applied to magnetic cards, for example, it is at least necessary that the recording material be heated to such high temperatures that the card substrate can be burned. For this reason, it is impossible in a substantial sense to rewrite the information that is once recorded in the recording material. The falsification of the recorded information is thus prohibited.

More particularly, an Fe—Al alloy having an Al/(Fe+Al) within the preferred range assumes an equilibrium phase under room temperature conditions which is a paramagnetic B2 phase. The B2 phase is constructed by BCC—Fe lattices combined with FeAl lattices of CsCl structure, the symmetry of these primitive lattices being kept high. When such an alloy is worked, Fe and Al are randomly replaced in atomic unit and holes and dislocations are introduced in accordance with the degree of working, whereby the regularity of the primitive lattices is lost, entailing a substantial decline of symmetry and permitting magnetism to develop at the same time. And when the worked alloy is heated to a temperature below the melting point, the regularity of the primitive lattices is at least partially restored and the saturation magnetization is reduced. However, usually, the state before working is not resumed. The transition by heating from the disordered phase to the ordered phase according to the invention means that the regularity of the primitive lattices is at least partially restored by heating. That is, the ordered phase is used herein in the concept that it encompasses not only the B2 phase free of strain, but also the B2 phase in which the asymmetry of lattices is partially left. It is noted that the restoration by heating of the symmetry of the primitive lattices can be confirmed by x-ray diffraction or electron beam diffraction.

In the crystalline alloy used herein, a too low aluminum content will lead to a lower rate of change of saturation magnetization by heating whereas the alloy with too high aluminum content will have poor environmental resistance. The poor environmental resistance, as used herein, means poor thermal stability, and specifically, that the alloy will reduce its saturation magnetization when it is kept in an environment at temperatures of about 100° C. With too high aluminum contents, a substantial decline of saturation magnetization occurs during storage in a high-temperature environment, but the saturation magnetization after heating remains unchanged, and consequently, the rate of change of saturation magnetization becomes extremely low. Too high aluminum contents also have the problem that the saturation magnetization itself becomes low prior to heating, resulting in read signals having low SN ratios.

Aluminum in the recording material may be replaced by $M^I$ which is at least one element selected from the group consisting of silicon (Si), germanium (Ge), tin (Sn), antimony (Sb), bismuth (Bi), molybdenum (Mo), tungsten (W), niobium (Nb), tantalum (Ta), titanium (Ti), zirconium (Zr), and hafnium (Hf). The replacement of Al by $M^I$ improves the environmental resistance. The content of $M^I$ in the recording material is preferably not greater than 10 at % because too high $M^I$ contents lead to low initial saturation magnetization (saturation magnetization inherent to the disordered phase).

Iron in the recording material may be replaced by $M^{II}$ which is at least one element selected from the group consisting of cobalt (Co), nickel (Ni), manganese (Mn), chromium (Cr), vanadium (V), and copper (Cu). The replacement of Fe by $M^{II}$ improves the rate of change of saturation magnetization. Of the $M^{II}$ elements, chromium is most effective for corrosion resistance improvement. The content of $M^{II}$ in the recording material is preferably not greater than 20 at % because too high $M^{II}$ contents sometimes lead to low saturation magnetization of disordered phase.

It is noted that when the atomic ratio Al/(Fe+Al) is calculated, $M^I$ and $M^{II}$ are regarded as Al and Fe, respectively.

The recording material may further contain $M^{III}$ which is at least one element selected from the group consisting of boron (B), carbon (C), nitrogen (N), and phosphorus (P). The element $M^{III}$ stabilizes the disordered phase when the alloy is prepared by a quenching or similar technique. It is also effective for preventing the transition from the disordered phase to the ordered phase. Therefore, like the above-mentioned element $M^I$, element $M^{III}$ has the effect of suppressing a decline of saturation magnetization during storage in a high-temperature environment. Little reduction of the initial saturation magnetization by the addition of $M^{III}$ is ascertained. However, because too high $M^{III}$ contents lead to a low rate of change of saturation magnetization, the content of $M^{III}$ is preferably not greater than 10 at % of the recording material. It is noted that among $M^{III}$ elements, carbon can be introduced, for example, from a dispersing medium or organic solvent used in milling the alloy powder.

Also in the recording material, oxygen is usually contained as an incidental impurity in addition to the above-described elements. It is likely for oxygen to be introduced during milling of the alloy. In most cases, the content of oxygen is preferably restricted to about 3 at % or lower.

In order to provide satisfactory SN ratio for the magnetic recording medium such as a magnetic card to perform for its purpose, it is desirable that the recording material have saturation magnetization of at least 45 emu/g, more desirably at least 50 emu/g, prior to heating, and reduce its saturation magnetization by at least 35 emu/g, more desirably at least 40 emu/g, upon heating.

A further improvement in SN ratio is achieved when the saturation magnetization of the recording material prior to heating and the drop of saturation magnetization by heating fall within the above-defined ranges, and the rate of change of saturation magnetization of the recording material, that is, the saturation magnetization prior to heating divided by the saturation magnetization after heating is at least 2, preferably at least 3. For the recording material whose saturation magnetization experiences a significant change, the reading sensitivity can be improved by performing reading while applying a dc magnetic field, as will be described later. When data reading is performed while applying a dc magnetic field across the recording material having a high rate of change of saturation magnetization, the recording material is not limited in coercivity and may be even a soft magnetic one.

It is understood that the saturation magnetization is as measured in an ordinary environmental temperature range, for example, of from −10° C. to 40° C.

The temperature at which the recording material begins to exhibit a change of saturation magnetization upon heating should preferably fall in the range of 50 to 500° C., more preferably 100 to 500° C., most preferably 150 to 400° C. It is also preferable that the above-defined change of saturation magnetization occur by heating to a temperature within this range. If the temperature at the start of change of saturation magnetization is too low, the recording material becomes less reliable because it becomes unstable to heat, experiences a substantial drop of saturation magnetization during storage in a high-temperature environment and hence, fails to provide a sufficient change of saturation magnetization upon recording. Also, precise recording becomes difficult because regions surrounding the heated spot also become sensitive. If the temperature at the start of change of saturation magnetization is too high, the heating temperature necessary for recording must be high, so that it becomes difficult to use less heat resistant resins as the substrate, and the recording equipment becomes expensive. When a recording layer as in a magnetic card is heated by means of a thermal head, the ultimate temperature at a deep level of the recording layer is lower than the ultimate temperature near the surface of the recording layer. If the temperature at the start of change of saturation magnetization is within the above-defined range, then a practically sufficient change of saturation magnetization is realized even when such a temperature distribution prevails within the recording layer. It is noted that the heating time required for recording is not critical although the saturation magnetization changes sufficiently by heating within 3 ms and a sufficient change of saturation magnetization can be realized even by heating within 2 ms. The lower limit of the heating time is usually about 0.5 ms although it varies with the ultimate temperature.

The Curie temperature of the recording material is not critical insofar as it is higher than the heating temperature described above.

No particular limits are imposed on the form of the recording material, which may be in thin ribbon, thin film or powder form. When the invention is applied to magnetic cards, for example, thin ribbons of the recording material are prepared by a liquid quenching technique such as a single chill roll technique and then attached to the substrate surface. A thin film of the recording material may be formed on the substrate surface by a thin film forming technique such as sputtering or evaporation. Alternatively, a powder which is obtained by finely dividing thin ribbons of the recording material or prepared by a water or gas atomizing technique is milled into flat or fine particles by milling means such as a medium agitation mill (e.g., attritor), and the powder in a binder is coated. Of these, flattened particles from thin ribbons and powder are most preferable. The medium agitation mill is an apparatus comprising a stationary milling vessel and an agitating shaft (also known as an agitator) inserted therein wherein the milling vessel is charged with milling media (such as balls or beads) along with a mass to be milled and the agitating shaft is rotated at a high speed for thereby generating frictional shear forces between milling media for milling the mass. When particles are flattened by the medium agitation mill, shear forces act on the particles so that the transition of the recording material into the disordered phase is promoted, achieving a higher saturation magnetization. The use of flat particles ensures formation of a coating having good surface properties so that magnetic write/read characteristics and heat conduction upon heating may be improved.

When the recording material is used in the form of a powder composed of flattened particles, the mean particle size is preferably at least 4 $\mu$m, more preferably at least 5 $\mu$m, and most preferably at least 7 $\mu$m. Particles with a too small mean particle size are difficult to handle and readily oxidizable so that their properties may deteriorate or the risk of ignition in air is left. On the other hand, when flattening is carried out by the above-described milling means, particles having a large diameter are necessarily broken, leaving few very large particles. Then, the mean particle size is generally up to 50 $\mu$m. The mean particle size used herein is as determined by a particle size analyzer using light scattering (for example, Micro-Track Particle Size Analyzer by Nikkiso K.K.). More particularly, when particles are measured for particle size by means of the particle size analyzer and a particle size distribution is determined therefrom, the mean particle size is given by the value ($D_{50}$) at which a cumulative frequency of 50% is reached in the particle size distribution. It is noted that flattened particles preferably have an average aspect ration, that is a major diameter divided by a thickness which is from 5 to 1,000, especially from 20 to 200. When applied to a coating type magnetic layer of a magnetic recording medium as in magnetic cards, the alloy powder of flattened particles should preferably have a specific surface area of at least 2 $m^2/g$, especially at least 3 $m^2/g$ (as measured by the BET method using nitrogen) for ease of coating and for improving the surface flatness of the magnetic layer.

Figure 10:
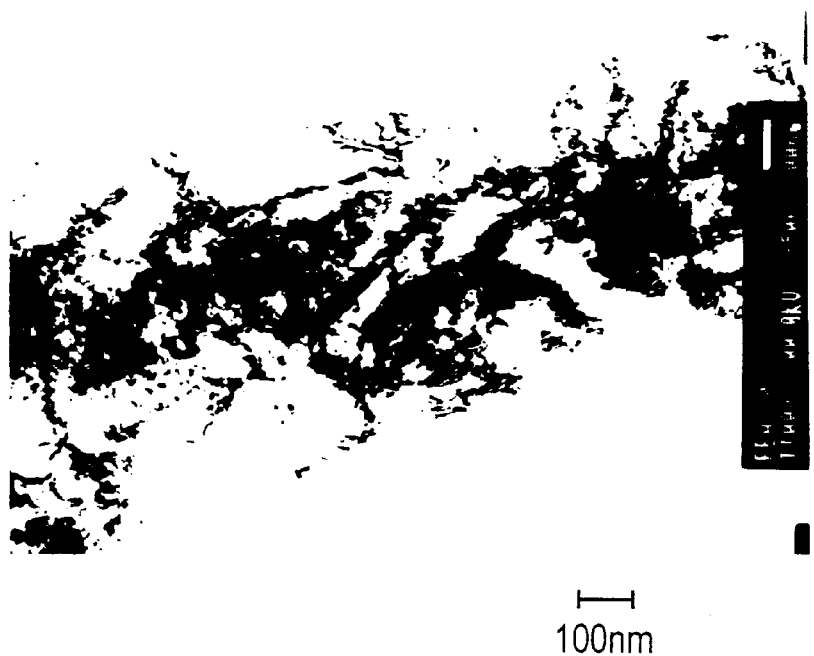
FIG. 10 is a figure-substituting photograph showing a particle structure, which is a TEM photomicrograph (bright-field image) of the alloy powder of FIG. 9 after further miling.

The recording material used herein favors that when it is observed by taking a bright-field image under a transmission electron microscope, dark regions of irregular shape are present in the bright-field image as seen from FIG. 10, for example. These dark regions are believed to be high dislocation density regions, that is, regions where dislocations are concentrated, but different from ordinary high dislocation density regions, that is, regions where a plurality of discrete dislocation lines representing the presence of line defects are present. The ordinary high dislocation density regions are difficult to observe in a bright-field image, that is, an image obtained from all diffraction waves, because of the low contrast, but observable as distinct lines only in a dark-field image, that is, an image obtained from selected diffraction waves. By contrast, in the present invention, dark regions are distinctly observable in a bright-field image and appear in such a way as to be also considered massive. The massive dark regions are also regarded to be regions where various line defects, point defects and plane defects are concentrated. This is supported by the facts that when the recording material of the invention is observed in a dark-field image, a $Fe_3Al$ type crystal lattice which is absent in the B2 phase is present in dark regions and that the orientation of a FeAl type crystal lattice is disordered within a crystal grain. The Fe—Al alloy in which such dark regions are present can be used as an irreversible recording material because it exhibits ferromagnetism at room temperature and lowers its saturation magnetization upon heating. Where such dark regions are present, the alloy is satisfactory in the above-described environmental resistance (thermal stability), ensuring to realize highly reliable magnetic recording media. Specifically, where dark regions with the above-described attributes are absent, even a Fe—Al alloy having equivalent saturation magnetization will decrease its saturation magnetization during storage in a high-temperature environment because the crystal strain is readily relaxed during the storage.

By increasing the proportion of dark regions occupying in the recording material as viewed in a bright-field image, the saturation magnetization prior to heating is fully increased and the environmental resistance (thermal stability) becomes better. Also, as will be described later, the proportion of dark regions is generally controlled by the milling time of alloy particles. A recording material having a low proportion of dark regions is short of milling, has a smaller specific surface area, and is inferior in ease of coating and surface flatness when applied to the coating type magnetic layer. For this and other reasons, the proportion of dark regions is preferably at least 15%, more preferably at least 18%, and most preferably at least 20%, as expressed in an areal ratio. On the other hand, for the reason that the saturation magnetization prior to heating reaches a plateau after the proportion of dark regions has exceeded a certain level whereas the saturation magnetization after heating generally increases linearly as the proportion of dark regions increases, it is preferred to restrict the proportion of dark regions in order to increase the rate of change of saturation magnetization. More illustratively, the proportion of dark regions is preferably up to 60%, more preferably up to 55%, and most preferably up to 50%, as expressed in an areal ratio.

Figure 5:
FIG. 5A is a figure-substituting photograph showing a particle structure, which is a TEM photomicrograph (bright-field image) of $Fe_{58}Al_{42}$ alloy powder as prepared by water atomization.
FIG. 5B is a figure-substituting photograph showing a crystal structure, which is an electron beam diffraction image of the alloy powder of FIG. 5A.
Figure 5:
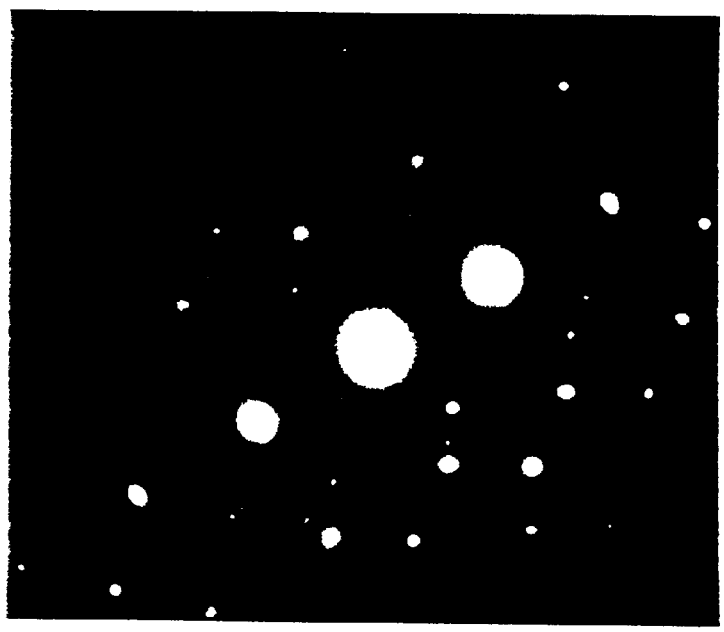
Figure 6:
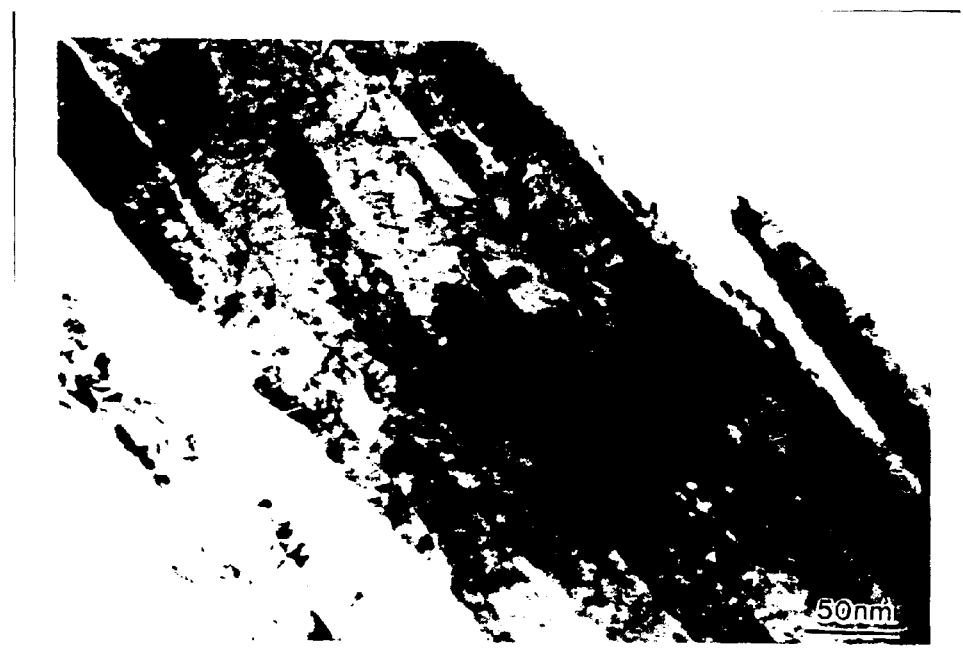
FIG. 6A is a figure-substituting photograph showing a particle structure, which is a TEM photomicrograph (bright-field image) of the alloy powder of FIG. 5A as further milled for 7.5 hours.
FIG. 6B is a figure-substituting photograph showing a crystal structure, which is an electron beam diffraction image of the alloy powder of FIG. 6A.
Figure 6:
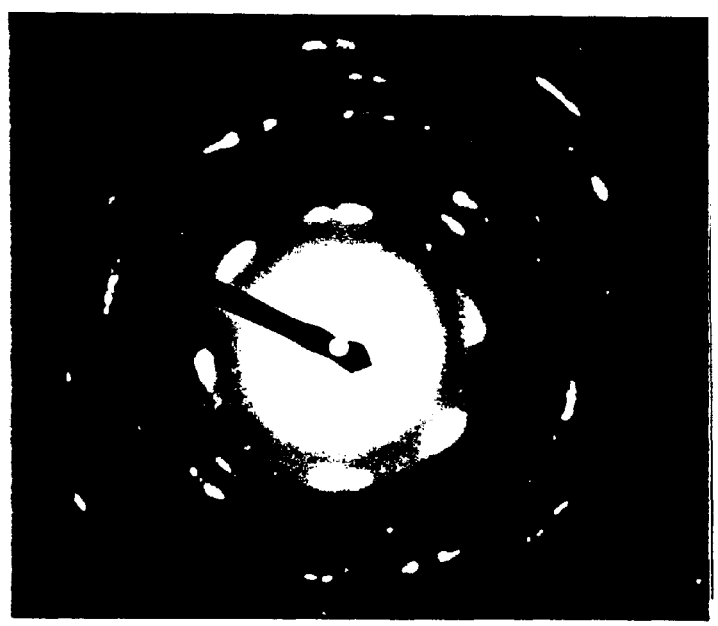
Figure 8:
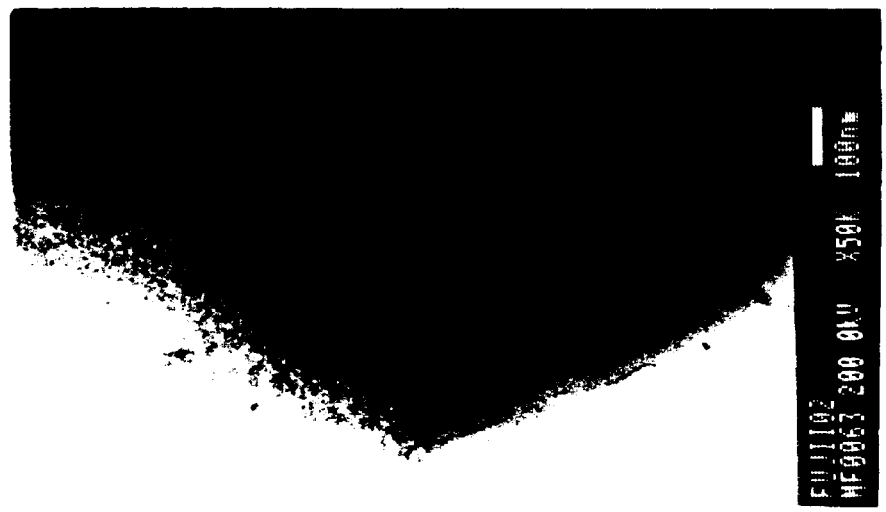
FIG. 8 is a figure-substituting photograph showing a particle structure, which is a TEM photomicrograph (bright-field image) of an Fe—Al alloy powder as prepared by water atomization.
Figure 14:
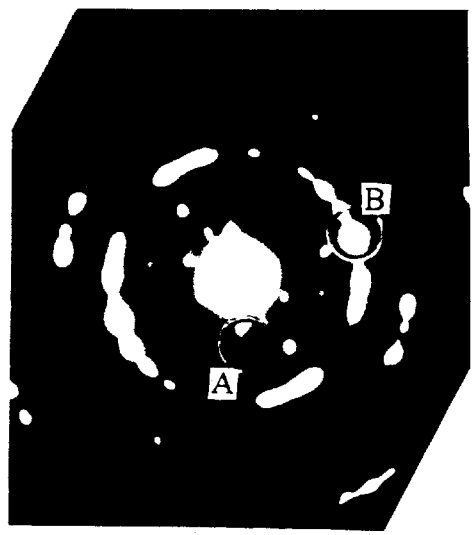
FIG. 14 is a figure-substituting photograph showing a crystal structure, which is an electron beam diffraction image of the circled region in FIG. 13.

The areal ratio of dark regions can be determined by means of an image processing/image analyzing apparatus using the contrast between dark regions and other regions. In determining the areal ratio, a bright-field image is usually processed for binarization. The distribution of concentration within the recording material in a bright-field image widely varies depending on the thickness of the recording material, the type and setting of a transmission electron microscope used. For example, the image of FIG. 8 shows alloy particles immediately after preparation in which the above-mentioned dark regions are absent, and the brightness is low throughout the image. Therefore, in binarizing the image, the level of drawing into black must be properly set such that substantially only the above-mentioned dark regions, that is, dark areas as a cluster of the above-mentioned lattice defects, become black. More particularly, since regions where the brightness is lower due to thickness and other causes yet have a higher brightness than the above-mentioned dark regions where lattice defects are concentrated, the regions where lattice defects are concentrated are identified among low-brightness regions by electron beam diffraction and the level of drawing into black is determined such that only those regions become black. In the event of alloy particles before milling in which lattice defects are not concentrated, even the regions giving a low brightness in a bright-field image provide an electron beam diffraction image with a spotty pattern as shown in FIG. 5B; in low-brightness regions included in the alloy particles which have been milled and flattened, there are present regions showing an electron beam diffraction image having ellipsoidal patterns resulting from expansion of spots or an annular pattern resulting from connection of such ellipsoidal patterns as shown in FIGS. 6B and 14. These low-brightness regions presenting an electron beam diffraction image having ellipsoidal or annular patterns are the dark regions defined in the present invention. Since the electron beam diffractometry can produce a diffraction image of a region having a small area, the dark regions and other low-brightness regions within a common particle can be discriminated. An exemplary binarized image obtained by identifying dark regions in this way is shown in FIG. 12. FIG. 12 results from the binarization of the bright-field image of FIG. 11. Among the low-brightness regions in FIG. 11, those regions having a brightness above a certain level are converted white in FIG. 12.

The area for computing the areal ratio of dark regions, that is, the measuring area is at least 0.25 $\mu m^2$, preferably at least 1 $\mu m^2$ in order to reduce measurement errors, but usually need not be in excess of 4 $\mu m^2$. Understandably, a plurality of bright-field images may be used for the measurement of the areal ratio of dark regions. Further, it is not essential to make measurement on only one alloy particle, and measurement may be made on two or more alloy particles constituting the powder to be tested.

The shape of the dark regions differs depending on the viewing direction. Insofar as the measuring area is large enough as mentioned above, the areal ratio of dark regions itself remains substantially unchanged even when dark regions appear in a different shape from a different viewing direction. The difference in the areal ratio of dark regions between different viewing directions is at most about 15% of the areal ratio of dark regions. Namely, when the areal ratio of dark regions is 30% as measured in one direction, the fluctuation of the areal ratio depending on the viewing direction is at most about ±5%. In the practice of the invention, it suffices that there is a viewing direction in which the areal ratio of dark regions falls within the above-defined range, and it is not necessary that the areal ratio of dark regions fall within the above-defined range in all viewing directions. Since the areal ratio changes little upon alteration of a viewing direction, the statistical proportion of lattice defects appearing as dark regions in a bright-field image is considered substantially isotropic in three dimensions.

Also, the areal ratio of dark regions remains substantially unchanged even when the recording material is heated to a temperature range of the above-described order upon recording. However, there is found the tendency that dark regions diminish when heated to a higher temperature.

It is desired that the dark regions observed in a bright-field image include those dark regions having a breadth of preferably at least 10 nm, more preferably at least 20 nm, and most preferably at least 50 nm. The recording material in which such dark regions of a substantial breadth are present provides sufficiently high saturation magnetization. It is noted that the breadth of dark regions is usually not greater than 200 nm.

Although the method of creating the above-mentioned dark regions is not particularly limited, methods of applying mechanical forces to the alloy are preferably used. Of these methods, the above-described flattening of alloy powder by milling is preferred. The milling time necessary to create dark regions with the above-described desirable attributes is empirically determined as appropriate since it varies with the composition and preparation process of alloy powder and the type and capability of a milling apparatus. It is understood that saturation magnetization increases with the progress of milling, reaches a peak, and then gradually decreases. It is believed that this decrease of saturation magnetization is due to the relaxation of strain in crystal lattices by heat release during milling.

J. Phys.: Condens. Matter 3 (1991) 5805–5816 and J. Phys.: Condens. Matter 8 (1996) 11243–11257 describe that paramagnetic Fe—Al alloys undergo superlattice dislocations by plastic deformation and turn to be ferromagnetic. In the literature, transmission electron photomicrographs of Fe—Al alloys converted ferromagnetic are described, in which dislocation lines are ascertainable. It is alleged in the literature that such dislocation lines are attributable to superlattice dislocations. However, these transmission electron photomicrographs are dark-field images (described as weak-beam images in the literature). Also, the dislocation lines found in these transmission electron photomicrographs are linear and ordinary, but utterly different from the above-described dark regions in the present invention. When the dislocation lines exhibiting such attributes in a dark-field image are viewed in a bright-field image, the dislocation lines become finer and have a substantially reduced contrast, exhibiting completely different attributes from the dark regions in the present invention. Further in the literature, saturation magnetization is not measured at room temperature. It is not described therein that Fe—Al alloys having such dislocation lines have a saturation magnetization of at least 45 emu/g at room temperature. Additionally, it is not described in the literature that the saturation magnetization of the Fe—Al alloy which has been converted ferromagnetic can be reduced by heating.

Also, Journal of Magnetism and Magnetic Materials, 54–57 (1986) 1065–1066 describes that Fe—Al alloys become ferromagnetic by plastic deformation. However, no transmission electron photomicrograph is presented in this reference. It is not described therein that the saturation magnetization of the Fe—Al alloy which has been converted ferromagnetic can be reduced by heating.

Referring to FIG. 1, there is illustrated one exemplary construction of the magnetic recording medium of the invention. A magnetic card 1 is illustrated in FIG. 1 as comprising an irreversible recording layer 3 and a magnetic recording layer 4 on a resinous substrate 2. The irreversible recording layer 3 is a region containing the above-described recording material according to the invention whereas the magnetic recording layer 4 is a region containing a magnetic recording material as used in conventional magnetic recording media. In the illustrated embodiment, the irreversible recording layer 3 is patterned as a single band although the pattern is not limited to a continuous one, and may be a discontinuous pattern, for example, a set of stripes like the bar code or a zigzag pattern. Further, the pattern is not limited to such a regular one, and may be an irregular pattern or a character pattern.

Data are recorded in the irreversible recording layer 3 by heating at least a portion of the irreversible recording layer 3 by means of a thermal head or laser beam, and cooling the heated portion, thereby inducing the predetermined pattern of changes of magnetic properties in the irreversible recording layer 3 in an irreversible manner. The recorded data are read by applying dc magnetic field across the irreversible recording layer 3 and then detecting the magnetization of the recording material for detecting the predetermined pattern of changes of magnetic properties, or by detecting the magnetization of the recording material while applying dc magnetic field across the irreversible recording layer 3. The regions of the irreversible recording layer 3 that are heated upon recording are not or little magnetized so that the magnetization pattern corresponding to the heating pattern upon recording is detectable upon reading. The means for detecting magnetization is not critical, and for example, conventional ring-shaped magnetic heads and magneto-resistance (MR) magnetic heads may be used.

Understandably, if the magnetization in the non-heated regions remains unchanged after recording, data reading can be performed without applying a dc magnetic field.

In order to form an irreversible recording layer which is homogeneous and satisfactory in surface flatness, its thickness is preferably at least 2 μm and more preferably at least 3 μm. However, the irreversible recording layer need not have a thickness in excess of 30 μm. In order to restrain an uneven temperature rise in a thickness direction during heating or recording, the thickness should preferably be not greater than 20 μm.

The information data to be recorded in the irreversible recording layer 3 are not particularly limited. When the magnetic card is used as an ordinary prepaid card wherein the irreversible recording layer 3 is combined with the magnetic recording layer 4, for example, bits of information including the monetary amount, the number of uses, and other necessary information are recorded in the magnetic recording layer 4, and those bits of information included in the information recorded in the layer 4 which are to be rewritten on every use, for example, the monetary amount and the number of uses are recorded in the irreversible recording layer 3. Whenever these bits of information are rewritten in the magnetic recording layer 4, the same are additionally written in the irreversible recording layer 3. Even when the information in the magnetic recording layer 4 is falsely altered, such falsification can be detected by comparing the information in the magnetic recording layer 4 with the information in the irreversible recording layer 3 because the latter is not rewritable.

The information to be recorded in the irreversible recording layer 3 is not limited to the above example. For example, an ID code may be recorded in a magnetic card as the card's own data. Provided that the information recorded in the magnetic recording layer 4 has been encrypted by way of the ID code, even if the contents in the magnetic recording layer 4 of this magnetic card are duplicated to the magnetic recording layer of another magnetic card having a different ID code, normal reading of the information is impossible. According to the invention, individual cards can be recorded in the irreversible recording layer 3 with the cards' own ID codes which cannot be falsified. The invention is quite effective for preventing the forgery by duplication.

In general, magnetic recording media have the advantage that recording of information data is easy and rewriting of recorded information data is possible, although in the magnetic card application, the same feature becomes the drawback that the falsification of information data is easy. In contrast, the magnetic recording medium of the present invention has the advantages that the falsification of information data is extremely difficult as described above, and a relatively inexpensive write/read equipment may be used since the information data can be read by magnetic reading rather than optical reading. The recording material used herein is susceptible to an irreversible change of magnetic properties at relatively low temperature and thus has a high recording sensitivity. Consequently, recording is easy even with a thermal head which applies a smaller amount of energy.

Understandably, a protective layer of resinous or inorganic material may be formed on the irreversible recording layer 3 and the magnetic recording layer 4 if necessary. The invention is not limited to the embodiment shown in FIG. 1, and the irreversible recording layer 3 and the magnetic recording layer 4 may be formed such that they overlap at least partially. In some cases, the magnetic recording layer 4 may be omitted.

EXAMPLE

Examples of the invention are given below by way of illustration.

Example 1

Alloy powders of the compositions shown in Table 1 were prepared by quenching molten alloys by water atomization. These alloy powders were composed of substantially spherical particles and had mean particle size of about 20 μm as measured by a particle size analyzer utilizing light scattering (Micro-Track Particle Size Analyzer by Nikkiso K.K.). It is noted that the mean particle size values reported hereinafter were obtained by similar measurement. Subsequently, using a medium agitation mill, each alloy powder was milled in toluene as a dispersing medium for 4 to 9 hours until an alloy powder of flat particles with mean particle size of about 10 μm was obtained.

Figure 2:
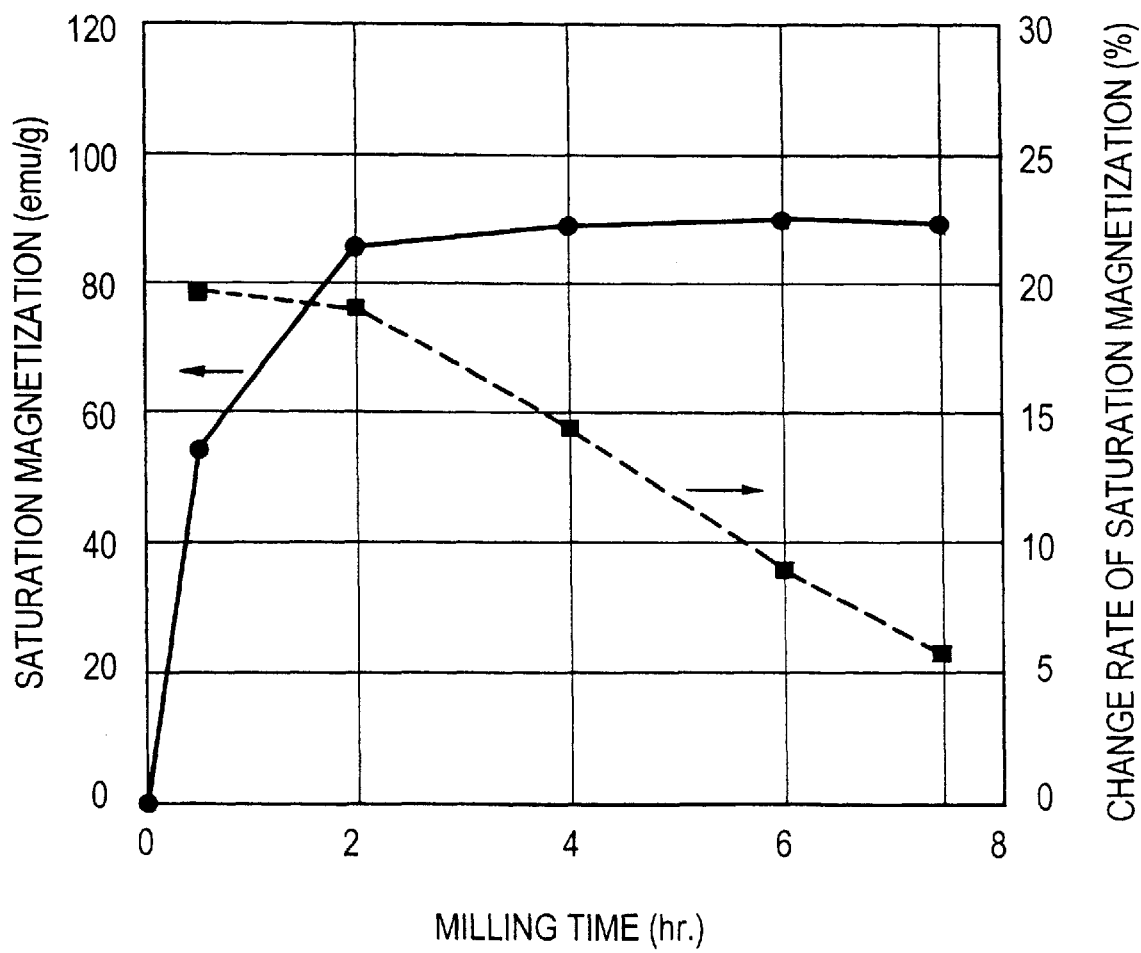
FIG. 2 is a graph showing, the dependency of the saturation magnetization of the $Fe_{58}Al_{42}$ alloy and a change rate thereof on the milling time.

During this fine comminution, the dependency of saturation magnetization and a rate of change thereof on the milling time was examined. FIG. 2 graphically illustrates the dependency of the saturation magnetization of a $Fe_{58}Al_{42}$ alloy (No. 102 in Table 1) and a change rate thereof on the milling time. The change rate of saturation magnetization shown in FIG. 2 is a change rate of saturation magnetization before and after heating, that is, (saturation magnetization before heating)/(saturation magnetization after heating at 200° C. and subsequent cooling). It is seen from FIG. 2 that the saturation magnetization abruptly increases within a short period of milling and remains approximately constant thereafter. In contrast, the change rate of saturation magnetization decreases as the milling time is extended. The alloy powder which had been milled for 2 hours was composed of flat particles and had a mean particle size of 31 μm. These results indicate that larger mean particle sizes are more likely to provide greater change rates of saturation magnetization.

Figure 3:
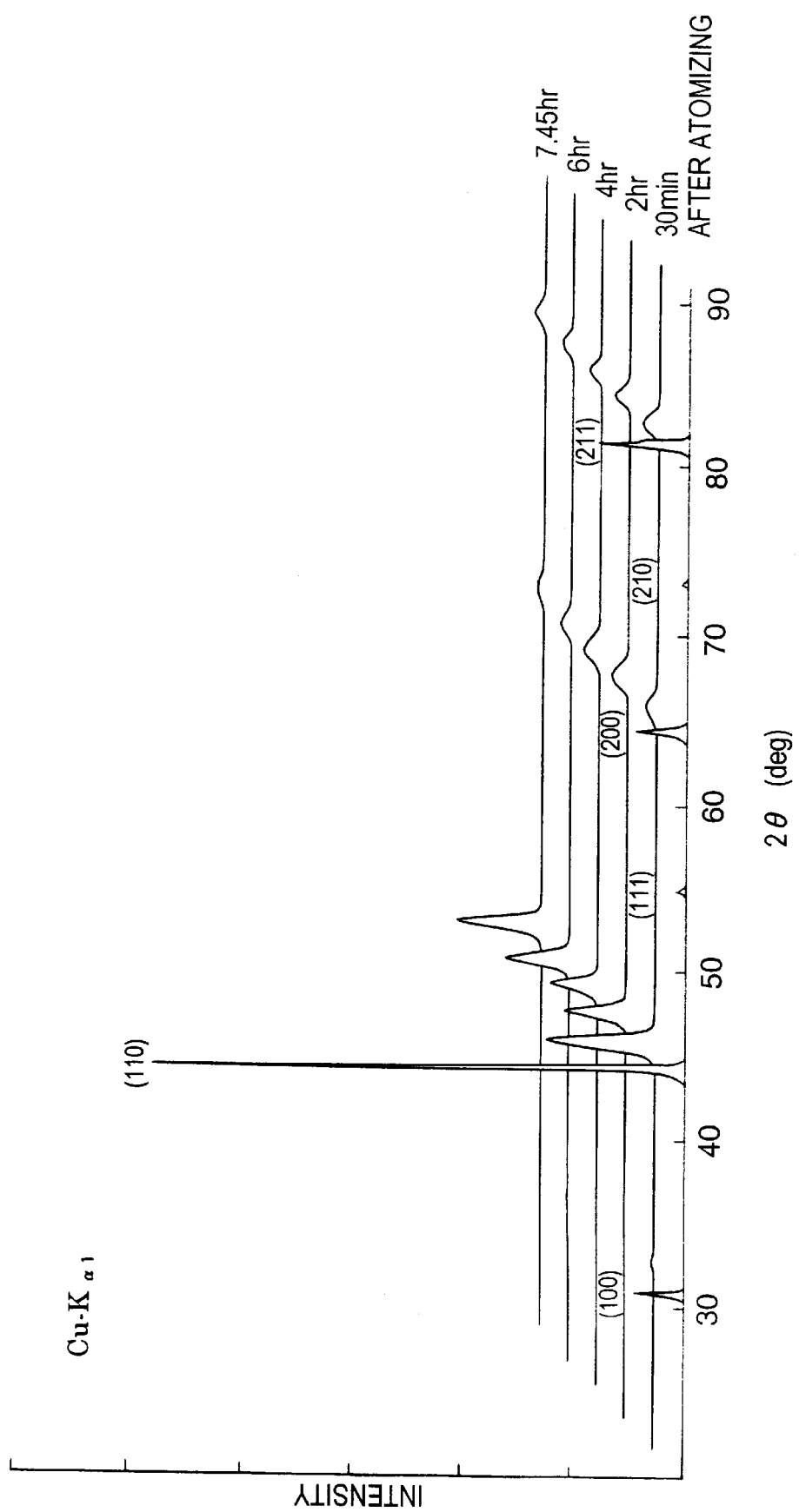
FIG. 3 is a diagram showing, the change of an x-ray diffraction curve of the $Fe_{58}Al_{42}$ alloy with the milling time.
Figure 4:
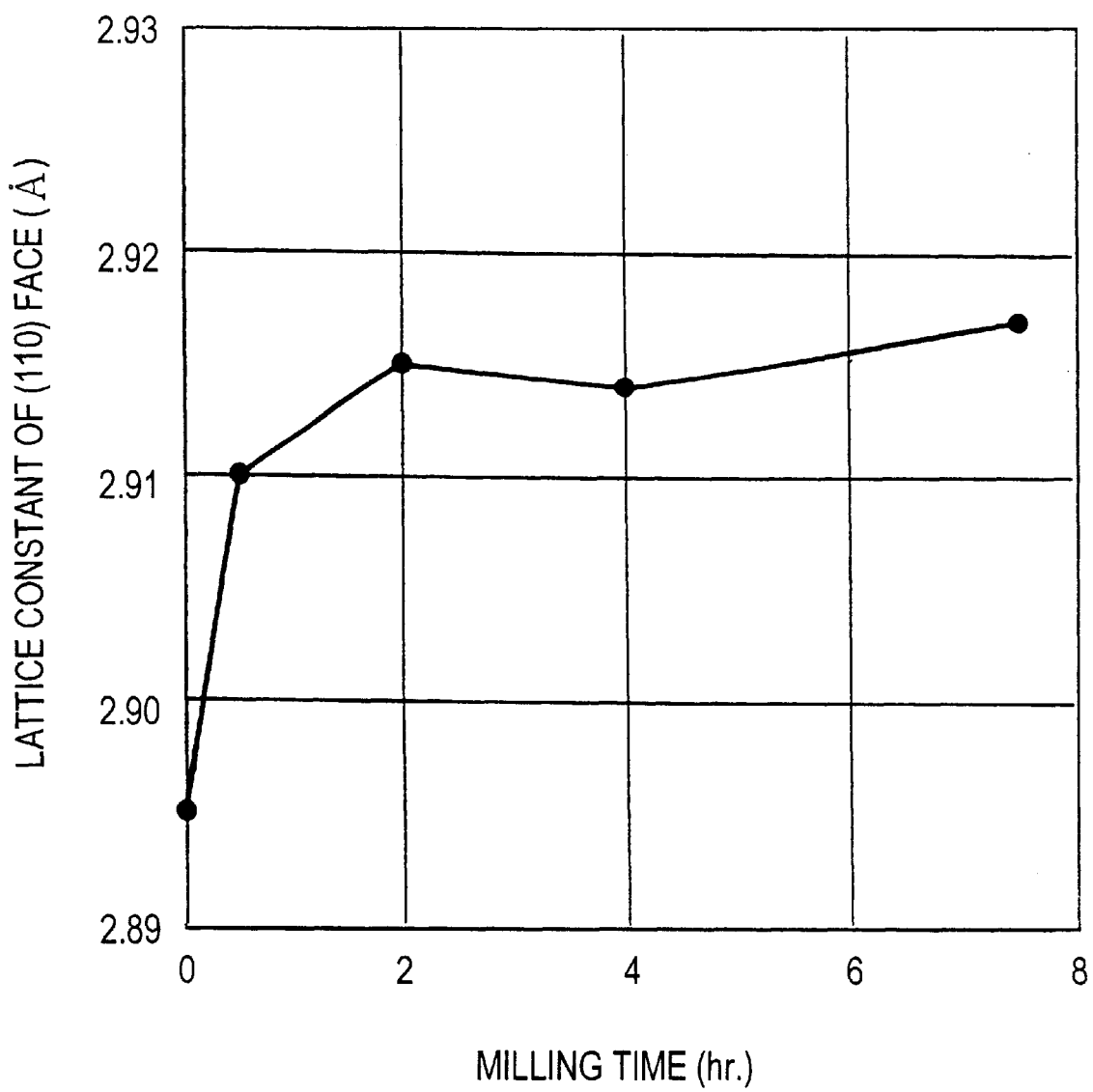
FIG. 4 is a diagram showing, when a $Fe_{58}Al_{42}$ alloy is milled, the dependency of the (110) plane lattice constant of the $Fe_{58}Al_{42}$ alloy on the milling time as determined from the results of x-ray diffractometry.

FIG. 3 shows the change of an x-ray diffraction curve of alloy No. 102 with the milling time. It is seen that the half-value width of diffraction peaks increases as comminution proceeds. This is because as a result of comminution, the crystal size is reduced and strain is introduced into crystals at the same time. FIG. 4 shows the dependency of the lattice constant on the milling time as determined from the results of x-ray diffractometry. It is seen from FIG. 4 that the lattice constant depends on the milling time as does the saturation magnetization. Note that the face indexes shown in FIGS. 3 and 4 are those of the B2 phase.

furnace to 200° C. at a heating rate of 10° C./min, kept at the temperature for 1 second, and quenched to room temperature whereupon saturation magnetization was measured again by means of the VSM. Table 1 shows the saturation magnetization Ms before and after heating and a rate of change of Ms.

Further, for evaluating environmental resistance, the alloy powders prior to heating to 200° C. were kept at 100° C. for 1 hour whereupon saturation magnetization was measured again. The results are also shown in Table 1.

For each alloy powder, a specimen for observation under a transmission electron microscope was prepared. First the alloy powder was mixed with a binder (epoxy resin) and rammed into a metallic tube having a diameter of 30 mm. This was sliced into a disc of 1 mm thick. The disc was abraded by a dimple grinder and a disc grinder, and etched by means of an ion beam etching apparatus (Precision Ion Polishing System Model 1691 by GATAN Co.), obtaining a foil as the specimen.

These specimens were analyzed by means of transmission electron microscopes (JEM-2000FX, JEM-2000EX and JEM-2010f by Nippon Electron K.K.). In all cases, the accelerating voltage was 200 kV. The maximum breadth and the areal ratio of dark regions in each specimen are shown in Table 1. The maximum breadth and the areal ratio of dark regions were determined by binarizing a bright-field image and processing it by an image analyzer as previously described.

TABLE 1

| Alloy powder No. | Composition (at %) | Ms (emu/g) Before heating | Ms (emu/g) After heating at 200° C. | Ms (emu/g) After storage | Change rate of Ms | Dark regions Maximum breadth (nm) | Dark regions Areal ratio (%) |
|---|---|---|---|---|---|---|---|
| 101 | $Fe_{63}Al_{37}$ | 107 | 35 | 105 | 3.1 | 61 | 25.3 |
| 102 | $Fe_{58}Al_{42}$ | 78 | 15.4 | 73 | 4.9 | 69 | 28.6 |
| 103 | $Fe_{53}Al_{47}$ | 44 | 5.3 | 7.2 | 8.3 | 77 | 31.9 |
| 104 | $Fe_{73}Al_{27}$ | 178 | 163 | 178 | 1.1 | 42 | 17.6 |

FIGS. 5A and 6A are transmission electron photomicrographs (bright-field images) of alloy powders which were coated on card substrates along with a binder. In these figures, a cross section perpendicular to the card substrate appears. FIGS. 5B and 6B are electron beam diffraction images of the same alloy powders as FIGS. 5A and 6A, respectively. The alloy powder of FIGS. 5A and 5B was alloy powder No. 102 prior to milling. The alloy powder of FIGS. 6A and 6B is the same alloy powder, but after milling for 7.5 hours whereby the alloy particles became flat. It is seen from FIG. 6A that crystal grains are collapsed by milling so that they lie, like layers, overlapped in a thickness direction of the powder, and dark regions are ascertainable.

It is believed from the foregoing results that in Fe—Al alloys, the atomic arrangement in crystals is disordered to change the environment of iron atoms, which induces changes of magnetization.

Next, the alloy powders were measured for saturation magnetization. Saturation magnetization was measured at room temperature and a maximum applied magnetic field strength of 10.0 kOe, using a vibrating sample magnetometer (VSM). Next, the samples were heated in an IR image As is evident from Table 1, those alloys having an aluminum content within the range of 0.30 to 0.45 (Nos. 101 and 102) experience greater change rates of saturation magnetization. They exhibit little loss of saturation magnetization when kept at a high temperature, indicating better environmental resistance. In contrast, the alloy having an aluminum content in excess of 0.45 (No. 103) has noticeably poor environmental resistance. Specifically, its change rate of saturation magnetization was 8.3 prior to the high-temperature storage, but lowered to about 1.4 after the high-temperature storage, indicating poor reliability. The alloy having an aluminum content of less than 0.30 (No. 104) shows a low change rate of saturation magnetization.

Each of the alloy powders in Table 1 was coated on a card substrate to form a recording layer, which was heated in a pattern by means of a thermal head. A SN ratio was determined from a change of read output caused by the difference of magnetization between heated and non-heated regions. Those alloys having an aluminum content within the range of 0.30 to 0.45 showed fully high SN ratios (1.6 for No. 101 and 2.2 for No. 102).

Note that the alloy powders shown in Table 1 had a value of major diameter divided by thickness of from about 30 to about 100.

Example 2

Alloys of the compositions shown in Table 2 were prepared by the single chill roll method. The alloys were milled in a stamp mill and a vessel mill, obtaining powders having a mean particle size of less than 45 µm. Subsequently, using a medium agitation mill, each alloy powder was milled in toluene as a dispersing medium until an alloy powder of flat particles with a mean particle size of about 10 µm was obtained. These flattened alloy powders were determined for saturation magnetization before and after 200° C. heating and a rate of change thereof. The results are shown in Table 2.

TABLE 2

| Alloy powder No. | Composition (at %) | Ms (emu/g) Before heating | Ms (emu/g) After heating at 200° C. | Change rate of Ms |
|---|---|---|---|---|
| 201 | $Fe_{60}(Al_{37}Ge_3)$ | 104 | 24 | 4.3 |
| 202 | $Fe_{59}(Al_{38}Sb_2Bi_1)$ | 81 | 21 | 3.9 |
| 203 | $Fe_{58}(Al_{38}Nb_3Mo_1)$ | 68 | 17 | 4.0 |
| 204 | $Fe_{59}(Al_{37}W_1)P_3$ | 110 | 29 | 3.8 |
| 205 | $Fe_{58.2}(Al_{38}Ta_3)N_{0.8}$ | 96 | 28 | 3.4 |
| 206 | $Fe_{58}(Al_{37}Ti_5)$ | 79 | 23 | 3.4 |
| 207 | $Fe_{56.8}(Al_{40}Zr_2)N_{1.2}$ | 71 | 21 | 3.4 |
| 208 | $Fe_{57}(Al_{39}Hf_1)B_3$ | 90 | 22 | 4.1 |
| 209 | $(Fe_{55}Mn_{10})Al_{35}$ | 80 | 26 | 3.1 |
| 210 | $(Fe_{53}Cu_{10})Al_{37}$ | 71 | 18 | 3.9 |
| 211 | $(Fe_{54.5}Cr_2V_{0.5}Al_{38}B_5$ | 85 | 27 | 3.1 |
| 212 | $(Fe_{45}Co_{15})Al_{40}$ | 112 | 20 | 5.6 |
| 213 | $(Fe_{37}Ni_{20})Al_{43}$ | 53 | 6.0 | 8.8 |
| 214 | $Fe_{62.7}(Al_{36.5}Si0.8)$ | 106 | 34 | 3.1 |
| 215 | $(Fe_{62.7}Cr_{1.5}) (Al_{35}Si_{0.8})$ | 101 | 35.5 | 2.85 |
| 216 | $Fe_{53}Al_{35}B_{12}$ | 92 | 90 | 1.0 |
| 217 | $Fe_{58}(Al_{30}Nb_{12})$ | 48 | 45 | 1.1 |
| 218 | $(Fe_2Cr_2)Al_{35C}11$ | 83 | 80 | 1.0 |

As is evident from Table 2, those alloy powders having an aluminum content within the range of 0.30 to 0.45 (Nos. 201 to 215) have greater change rates of saturation magnetization. In contrast, those alloy powders having too high $M^{III}$ content (Nos. 216 and 218) and the alloy powder having too high $M^I$ content (No. 217) have low change rates of saturation magnetization.

Of the alloy powders shown in Table 2, No. 214 and No. 215 having chromium added to No. 214 were examined for corrosion resistance by the following procedure. Each alloy powder was mixed with a binder and a solvent to form a paint, which was applied onto a PET film to form a magnetic layer of 30 µm thick. The coated film was cut into sections of 6 mm square. Each specimen was immersed in 5% acetic acid water for 24 hours whereupon a percent loss of saturation magnetization was determined. As a result, the percent loss of saturation magnetization was 48% in No. 214, but as low as 29% in No. 215 with chromium added. Since the specific surface area was 4.09 m²/g in No. 214 and 5.70 m²/g in No. 215 and the mean particle size $D_{50}$ was 16.54 µm in No. 214 and 15.74 µm in No. 215, the difference in corrosion resistance is not attributable to the specific surface area and $D_{50}$, but to the composition.

Example 3

Figure 7:
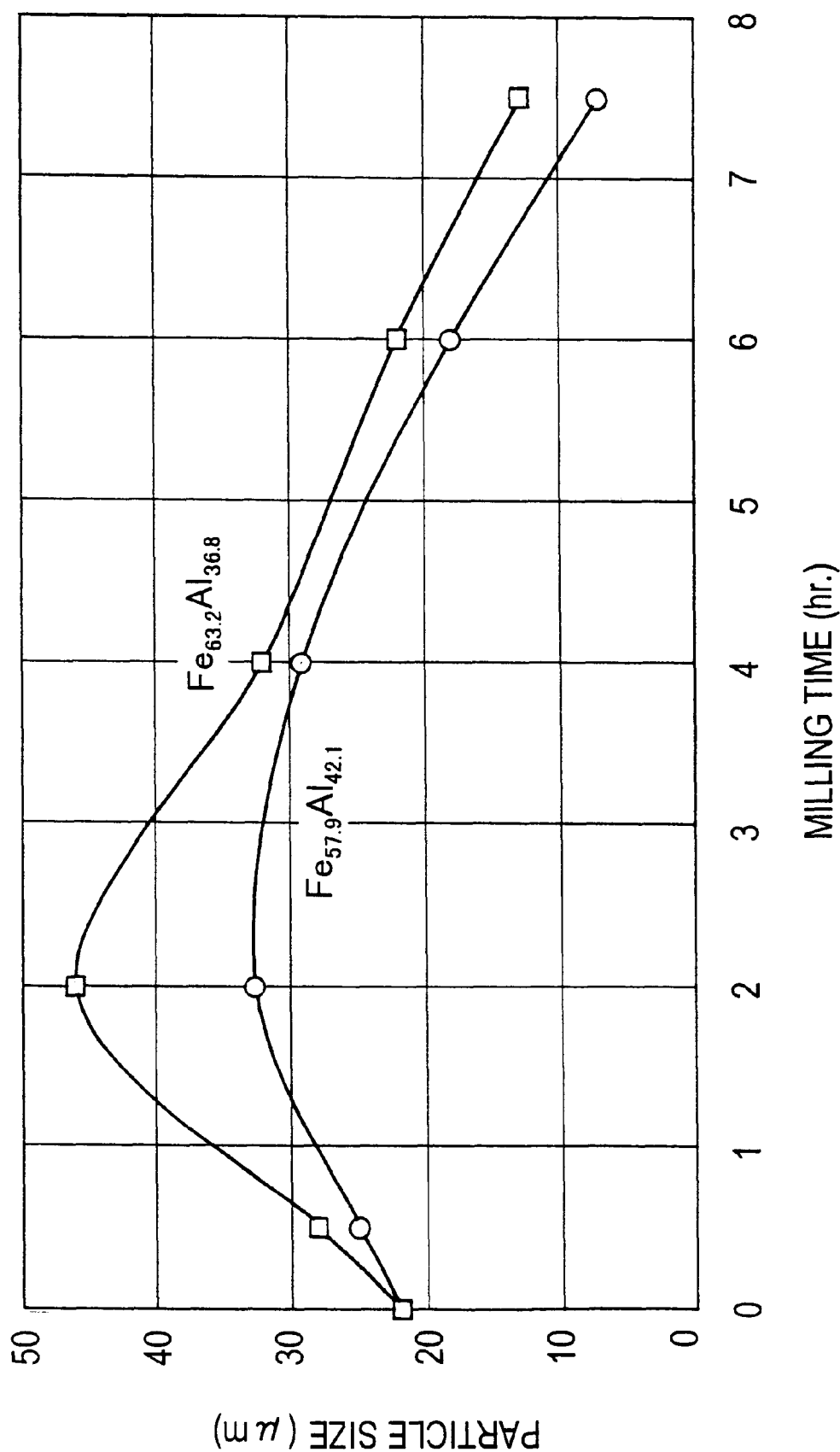
FIG. 7 is a graph showing the mean particle size versus milling time of an alloy powder.

An alloy powder of the composition (atomic ratio) $Fe_{63.2}Al_{36.8}$ and an alloy powder of the composition $Fe_{57.9}Al_{42.1}$ were prepared by water atomization as in Example 1. Each alloy powder was composed of substantially spherical particles and had a mean particle size of about 20 µm. Subsequently, using a medium agitation mill operating at a lower rotational speed than that used in Example 1, each alloy powder was milled in toluene as a dispersing medium for 0.5 to 7.5 hours, during which period a change of mean particle size by milling was examined. The results are shown in FIG. 7. It is seen from FIG. 7 that by milling, the alloy powders are once increased in mean particle size as a result of flattening and thereafter, divided into finer particles.

For each alloy powder, a specimen for observation under a transmission electron microscope was prepared and analyzed as in Example 1.

Figure 9:
FIG. 9 is a figure-substituting photograph showing a particle structure, which is a TEM photomicrograph (bright-field field image) of the milled alloy powder of FIG. 8.

Bright-field images of a $Fe_{57.9}Al_{42.1}$ particle are shown in FIGS. 8, 9 and 10. FIG. 8 corresponds to the particle immediately after preparation by water atomization; FIG. 9 corresponds to the particle after 1 hour of milling; and FIG. 10 corresponds to the particle after 5 hours of milling. In FIG. 8, the presence of dark regions is not ascertainable. Dark regions having a maximum breadth of about 19 nm are ascertained in FIG. 9, and dark regions having a maximum breadth of about 175 nm are ascertained in FIG. 10. The areal ratio of dark regions is 17.6% in FIG. 9 and 36.3% in FIG. 10.

Figure 11:
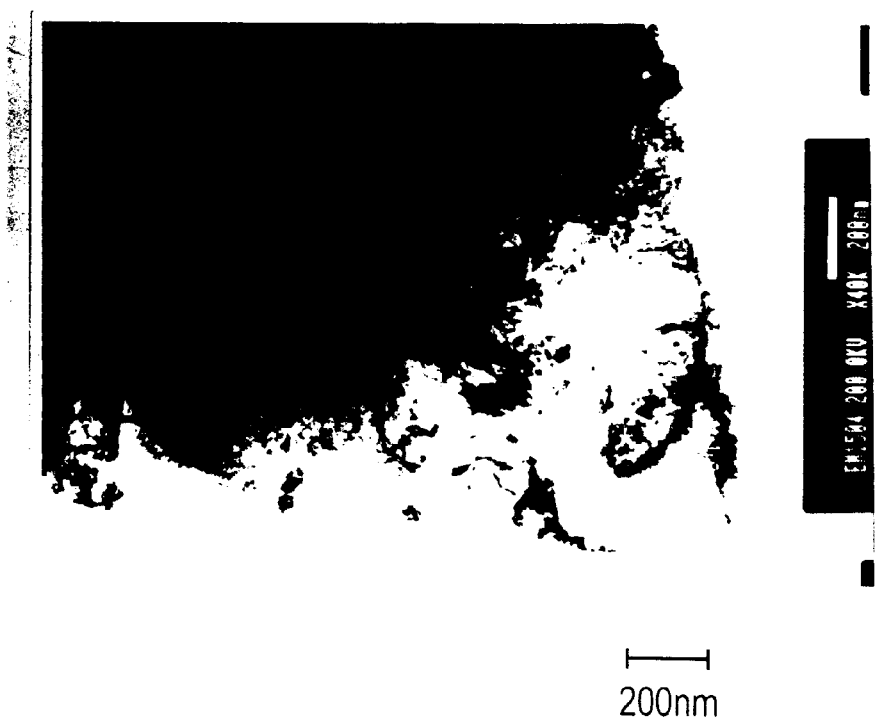
FIG. 11 is a figure-substituting photograph showing a particle structure, which is a TEM photomicrograph (bright-field image) of an Fe—Al alloy powder after milling.
Figure 12:
FIG. 12 is a diagram depicted by binarizing the TEM photomicrograph (bright-field image) of FIG. 11.

For exemplifying the binarization procedure in determining the maximum breadth and areal ratio of dark regions, FIG. 11 shows a bright-field image prior to binarization and FIG. 12 is a binarized image thereof. The particle shown in FIG. 11 had the composition $Fe_{63.2}Al_{36.8}$ and its dark regions had a maximum breadth of about 94 nm and an areal ratio of 30.3%.

Figure 13:
FIG. 13 is a figure-substituting photograph showing a particle structure, which is a TEM photomicrograph (bright-field image) of an Fe—Al alloy powder after milling.

Next, for the particle having the bright-field image shown in FIG. 13, a region of the particle delimited by a circle in FIG. 13 was analyzed by taking an electron beam diffraction image and a dark-field image. This particle had the composition $Fe_{57.9}Al_{42.1}$ and its dark regions had a maximum breadth of about 44 nm and an areal ratio of 18%.

Figure 15:
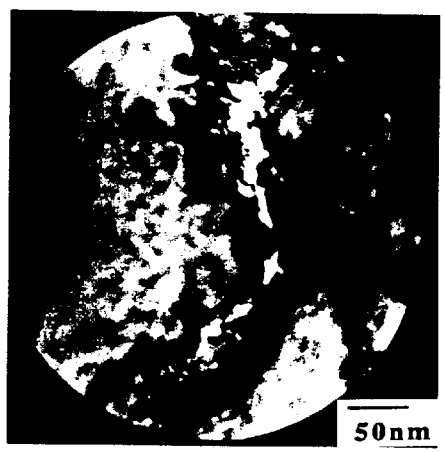
FIG. 15 is a figure-substituting photograph showing a particle structure, which is a TEM photomicrograph (dark-field image) of the circled region in FIG. 13.
Figure 16:
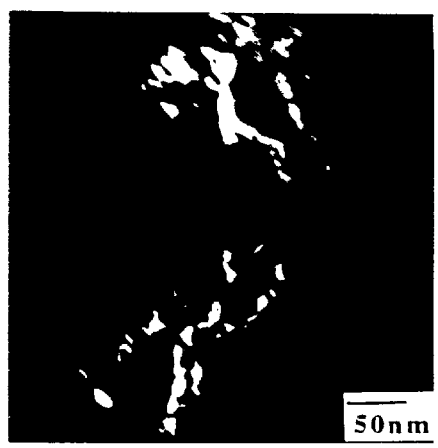
FIG. 16 is a figure-substituting photograph showing a particle structure, which is a TEM photomicrograph (dark-field image) of the circled region in FIG. 13.

An electron beam diffraction image of the circled region is shown in FIG. 14. In FIG. 14, a diffraction pattern depicted by symbol A is attributable to the (100), (110) and (111) faces of a $Fe_3Al$ type crystal, and a diffraction pattern depicted by symbol B is attributable to the (110) face of a FeAl type crystal. FIGS. 15 and 16 show dark-field images by diffraction waves corresponding to symbols A and B in FIG. 14, respectively. The regions viewed white in FIGS. 15 and 16 correspond to the (100), (110) and (111) faces of a $Fe_3Al$ type crystal and the (110) face of a FeAl type crystal, respectively. It is seen from these results that lattice distortion is concentrated in the dark regions observable in a bright-field image.

Next, the relationship of saturation magnetization to the areal ratio of dark regions within an alloy particle was examined. The saturation magnetization before and after heating and a change rate thereof were determined as in Example 1. The saturation magnetization before and after heating is shown in FIG. 17, and the change rate of saturation magnetization is shown in FIG. 18.

Figure 17:
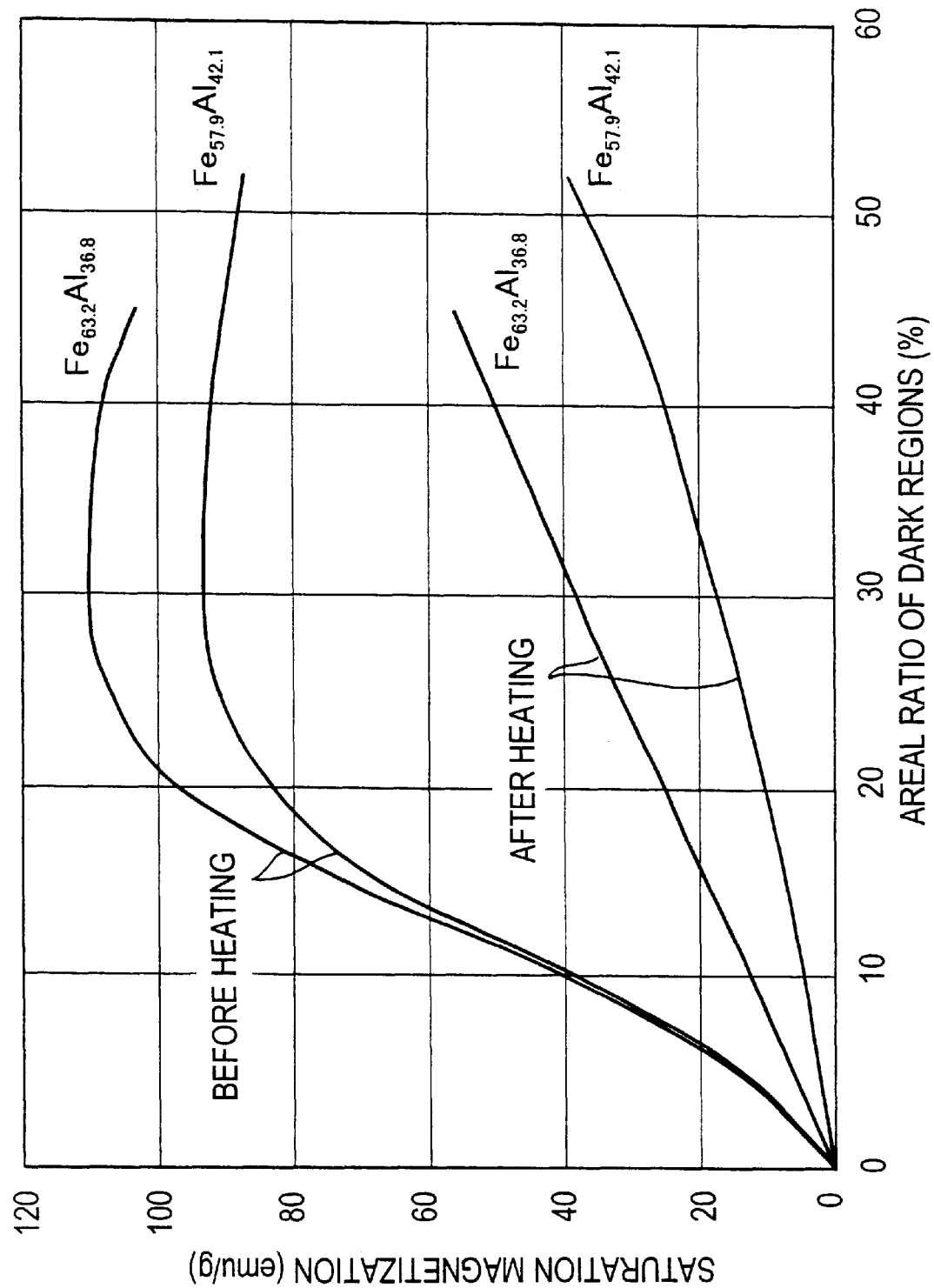
FIG. 17 is a graph showing the saturation magnetization before and after heating versus the areal ratio of dark regions in a bright-field image.
Figure 18:
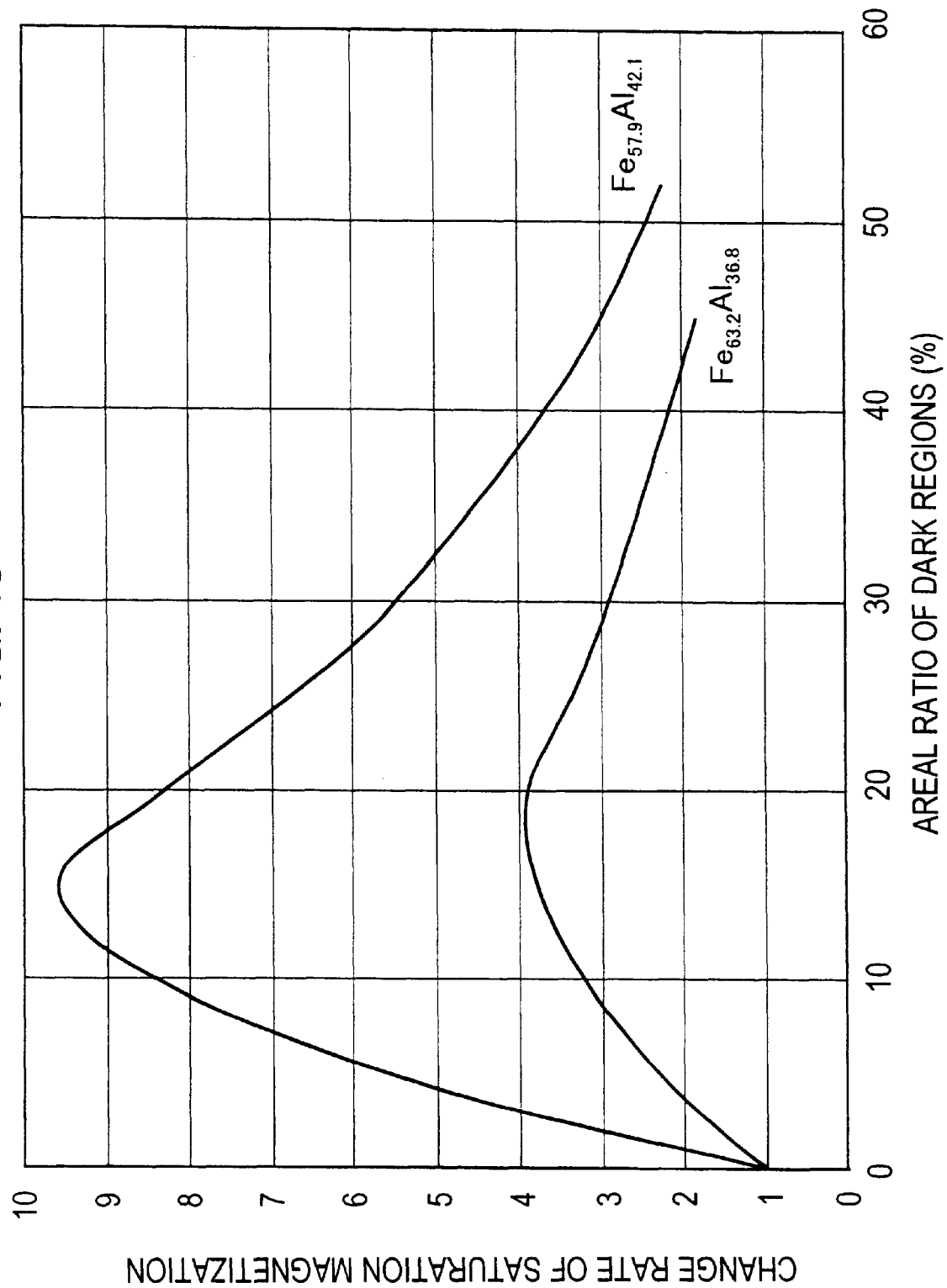
FIG. 18 is a graph showing the change rate of saturation magnetization versus the areal ratio of dark regions in a bright-field image.

It is seen from FIGS. 17 and 18 that saturation magnetization and a change rate thereof depend on the areal ratio of dark regions. Since the areal ratio of dark regions becomes higher as the milling time is extended, the desired characteristics are obtainable by flattening the alloy powder so that the areal ratio of dark regions reaches an appropriate value.

Next, the relationship of thermal stability to the areal ratio of dark regions was examined by the following procedure. Using an alloy powder having the composition $Fe_{57.9}Al_{42.1}$, there were furnished a sample which was milled for 2 hours to give an areal ratio of dark regions of 30% and another sample which was milled for 7.5 hours to give an areal ratio of dark regions of 52%. These samples were held at temperatures of 80° C., 100° C. and 120° C., and the time passed until the saturation magnetization begun to decline was measured. As a result, at any of the holding temperatures, the decline-start time of the sample with a milling time of 7.5 hours was about 20% longer than that of the sample with a milling time of 2 hours, indicating that the former sample had superior thermal stability.

Figure 19:
FIG. 19 is a figure-substituting photograph showing a particle structure, which is a TEM photomicrograph (bright-field image) of an Fe—Al alloy powder after milling and heating.

FIG. 19 shows a bright-field image of a particle which was heated to 200° C. and then cooled. This particle had the composition $Fe_{63.2}Al_{36.8}$ and its dark regions had a maximum breadth of about 49 nm and an areal ratio of 29.4% both before and after heating. Any change of dark regions by heating was not ascertained.

It is noted that in the foregoing examples, each alloy powder contained up to 2 at % of carbon originating from toluene used in milling and also contained up to 3 at % of oxygen.

Also, alloy powders having an areal ratio of dark regions of less than 15% had a specific surface area of less than 2 $m^2/g$ as measured by the bet method using nitrogen.

What is claimed is:

1. A magnetic recording medium comprising a recording material comprising a disordered phase crystalline alloy of iron and aluminum, said recording material having a saturation magnetization of at least 45 emu/g wherein the total amount of iron and aluminum is at least 90 at %, a portion of the aluminum in said recording material is replaced by $M^I$ which is at least one element selected from the group consisting of silicon, germanium, tin, antimony, bismuth, molybdenum, tungsten, niobium, tantalum, titanium, zirconium, and hafnium, and the content of $M^I$ in said recording material is up to 10 at %, the atomic ratio $Fe/(Fe+Al+M^I)$ ranges from 0.30 to 0.45, and said disordered phase crystalline alloy undergoes a transition to an ordered phase crystalline alloy upon heating, said ordered phase crystalline alloy having a saturation magnetization which is at least 35 emu/g lower than said disordered phase.

2. A magnetic recording medium comprising a recording material comprising a disordered phase crystalline alloy of iron and aluminum, said recording material having a saturation magnetization of at least 45 emu/g wherein the total amount of iron and aluminum is at least 90 at %, a portion of the iron in said recording material is replaced by $M^{II}$ which is at least one element selected from the group consisting of cobalt, nickel, manganese, chromium, vanadium, and copper, and the content of $M^{II}$ in said recording material is up to 20 at %, the atomic ratio $Fe+M^{II}/(Fe+Al+M^{II})$ ranges from 0.30 to 0.45, and said disordered phase crystalline alloy undergoes a transition to an ordered phase crystalline alloy upon heating, said ordered phase crystalline alloy having a saturation magnetization which is at least 35 emu/g lower than said disordered phase.

3. A magnetic recording medium comprising a recording material comprising a disordered phase crystalline alloy of iron and aluminum, said recording material having a saturation magnetization of at least 45 emu/g wherein the total amount of iron and aluminum is at least 90 at % and the atomic ratio Fe/(Fe+Al) ranges from 0.30 to 0.45, said recording material further contains up to 10 at % of $M^{III}$ which is at least one element selected from the group consisting of boron, carbon, nitrogen, and phosphorus, and said disordered phase crystalline alloy undergoes a transition to an ordered phase crystalline alloy upon heating, said ordered phase crystalline alloy having a saturation magnetization which is at least 35 emu/g lower than said disordered phase.

4. The magnetic recording medium of claim 1, wherein said recording material has a ratio of the saturation magnetization before heating to the saturation magnetization after heating which is at least 2/1.

5. The magnetic recording medium of claim 1, wherein said recording material is a powder of flattened particles.

6. The magnetic recording medium of claim 1, which is a magnetic card comprising a resinous substrate and an irreversible recording layer thereon containing said recording material.

7. A method for writing on the magnetic recording medium of claim 1, comprising
heating at least a portion of the recording material by means of a thermal head or laser beam, thereby changing the saturation magnetization of the recording material in an irreversible manner.

8. The method of claim 7 wherein after writing, reading is carried out by detecting the magnetization of the recording material.

9. The method of claim 7 wherein after writing, reading is carried out by applying dc magnetic field across the magnetic material and then detecting magnetic flux from the recording material.

10. The method of claim 7 wherein after writing, reading is carried out by detecting the magnetization of the recording material while applying dc magnetic field across the magnetic material.

11. The magnetic recording medium of claim 1, wherein the content of $M^I$ ranges from 0.8 to 10 at %.

12. The magnetic recording medium of claim 2, wherein the content of $M^{II}$ ranges from 1.5 to 20 at %.

13. The magnetic recording medium of claim 3, wherein the content of $M^{III}$ ranges from 0.8 to 10 at %.

14. The magnetic recording medium of claim 2, wherein said recording material has a ratio of the saturation magnetization before heating to the saturation magnetization after heating which is at least 2/1.

15. The magnetic recording medium of claim 2, wherein said recording material is a powder of flattened particles.

16. The magnetic recording medium of claim 2, which is a magnetic card comprising a resinous substrate and an irreversible recording layer thereon containing said recording material.

17. A method for writing on the magnetic recording medium of claim 2, comprising
heating at least a portion of the recording material by means of a thermal head or laser beam, thereby changing the saturation magnetization of the recording material in an irreversible manner.

18. The method of claim 17, wherein after writing, reading is carried out by detecting the magnetization of the recording material.

19. The method of claim 17, wherein after writing, reading is carried out by applying a dc magnetic field across the magnetic material and then detecting magnetic flux from the recording material.

20. The method of claim 17, wherein after writing, reading is carried out by detecting the magnetization of the recording material while applying a dc magnetic field across the magnetic material.

21. The magnetic recording medium of claim 3, wherein said recording material has a ratio of the saturation magnetization before heating to the saturation magnetization after heating which is at least 2/1.

22. The magnetic recording medium of claim 3, wherein said recording material is a powder of flattened particles.

23. The magnetic recording medium of claim 3, which is a magnetic card comprising a resinous substrate and an irreversible recording layer thereon containing said recording material.

24. A method for writing on the magnetic recording medium of claim 3, comprising heating at least a portion of the recording material by means of a thermal head or laser beam, thereby changing the saturation magnetization of the recording material in an irreversible manner.

25. The method of claim 24, wherein after writing, reading is carried out by detecting the magnetization of the recording material.

26. The method of claim 24, wherein after writing, reading is carried out by applying a dc magnetic field across the magnetic material and then detecting magnetic flux from the recording material.

27. The method of claim 24, wherein after writing, reading is carried out by detecting the magnetization of the recording material while applying a dc magnetic field across the magnetic material.

* * * * *

UNITED STATES PATENT AND TRADEMARK OFFICE
CERTIFICATE OF CORRECTION

PATENT NO. : 6,310,837 B1
DATED : October 30, 2001
INVENTOR(S) : Chou et al.

Page 1 of 1

It is certified that error appears in the above-identified patent and that said Letters Patent is hereby corrected as shown below:

<u>Title page,</u>
Item [63], the Related U.S. Application information should read:

Related U.S. Application Data
[63]   Continuation of application No. PCT/JP98/00569, filed on Feb. 12, 1998

Signed and Sealed this

Twelfth Day of March, 2002

*Attest:*

JAMES E. ROGAN
*Attesting Officer*   *Director of the United States Patent and Trademark Office*